(12) United States Patent
Barton et al.

(10) Patent No.: US 11,257,024 B2
(45) Date of Patent: Feb. 22, 2022

(54) SYSTEMS AND METHODS FOR TRACKING LOCATION AND MONITORING ENVIRONMENTAL CONDITIONS OF AN ASSET IN TRANSIT

(71) Applicant: Tracking Concepts LLC, Grapevine, TX (US)

(72) Inventors: James D. Barton, Grapevine, TX (US); Ida Cathcart, Grapevine, TX (US)

(73) Assignee: Tracking Concepts LLC, Aubrey, TX (US)

(*) Notice: Subject to any disclaimer, the term of this patent is extended or adjusted under 35 U.S.C. 154(b) by 167 days.

(21) Appl. No.: 16/207,834

(22) Filed: Dec. 3, 2018

(65) Prior Publication Data

US 2019/0102735 A1 Apr. 4, 2019

Related U.S. Application Data

(63) Continuation-in-part of application No. 14/856,606, filed on Sep. 17, 2015, now abandoned.

(60) Provisional application No. 62/594,579, filed on Dec. 5, 2017.

(51) Int. Cl.
*G06Q 10/08* (2012.01)
(52) U.S. Cl.
CPC ................. *G06Q 10/0833* (2013.01)
(58) Field of Classification Search
CPC .................................................. G06Q 10/0833
See application file for complete search history.

(56) References Cited

U.S. PATENT DOCUMENTS

| | | | |
|---|---|---|---|
| 5,857,789 A | 1/1999 | Day et al. | |
| 8,972,171 B1 | 3/2015 | Barth | |
| 2003/0052786 A1* | 3/2003 | Dickinson | B65D 81/03 340/572.8 |
| 2004/0061324 A1* | 4/2004 | Howard | G01S 19/09 283/69 |
| 2004/0222625 A1 | 11/2004 | Major et al. | |
| 2006/0184681 A1* | 8/2006 | Bernardi | H04L 29/12207 709/229 |
| 2008/0030330 A1* | 2/2008 | Vock | A61B 5/6807 340/568.1 |
| 2008/0162304 A1 | 7/2008 | Ourega | |
| 2009/0055691 A1* | 2/2009 | Ouksel | H04W 64/00 714/48 |
| 2010/0289669 A1* | 11/2010 | Saltzman | H04Q 9/00 340/870.17 |

(Continued)

FOREIGN PATENT DOCUMENTS

WO PCT/US2015062598 2/2016

OTHER PUBLICATIONS

Hrinya, Greg, "Smart technology redefines the label industry: the 'internet of things' has brands and consumers closer than ever before," Label & Narrow Web, 20.2: 50(4), Rodman Publishing, Mar. 2015.*

*Primary Examiner* — Nathan Erb
(74) *Attorney, Agent, or Firm* — Ryan, Mason & Lewis, LLP; Frank V. DeRosa

(57) ABSTRACT

Systems, methods and devices are provided for real-time tracking a location an asset (e.g., package) that is in transit (rail, air, truck, etc.) and real-time monitoring of environmental conditions that the asset is subjected to during transit such as temperature, light exposure, barometric pressure, and other conditions.

17 Claims, 14 Drawing Sheets

(56) References Cited

U.S. PATENT DOCUMENTS

| | | | |
|---|---|---|---|
| 2011/0062237 A1* | 3/2011 | Chaves | G06K 19/06018 |
| | | | 235/454 |
| 2011/0071944 A1 | 3/2011 | Heiden | |
| 2011/0145162 A1* | 6/2011 | Vock | G06Q 10/08 |
| | | | 705/333 |
| 2012/0019398 A1 | 1/2012 | Vogt et al. | |
| 2012/0216252 A1 | 8/2012 | Skaaksrud et al. | |
| 2013/0094693 A1* | 4/2013 | Bolton | G06Q 10/08 |
| | | | 382/101 |
| 2013/0346336 A1 | 12/2013 | Murphy et al. | |
| 2014/0196278 A1 | 7/2014 | Finn | |
| 2014/0358378 A1* | 12/2014 | Howard | F16F 15/022 |
| | | | 701/45 |
| 2015/0002299 A1* | 1/2015 | Sandvick | G08B 21/02 |
| | | | 340/584 |
| 2015/0046363 A1 | 2/2015 | McNamara et al. | |
| 2015/0145650 A1* | 5/2015 | Levan | G06Q 10/0833 |
| | | | 340/10.1 |
| 2015/0187234 A1* | 7/2015 | Atkinson | G06K 19/0717 |
| | | | 40/5 |
| 2016/0012391 A1 | 1/2016 | Burnett | |
| 2016/0236638 A1* | 8/2016 | Lavie | H04N 7/185 |
| 2017/0208426 A1 | 7/2017 | Komoni et al. | |
| 2017/0229000 A1* | 8/2017 | Law | G01K 3/04 |
| 2019/0303862 A1* | 10/2019 | Bollinger | G06F 3/04886 |
| 2020/0111342 A1* | 4/2020 | Hummer | H04M 1/7253 |

\* cited by examiner

 Notification ICON of Package Delay Due to Lightening

 Notification ICON of Package Delay Due to Snow Storm

 Notification ICON of Package Delay Due to Tornado

 Notification ICON of Package Delay Due to Blizzard

 Notification ICON of Package Delay Due to Heavy Rain/Extreme Cold

 Notification ICON of Package Delay Due to Hail

 Notification ICON of Package Delay Due to High Winds

FIG. 13

SYSTEMS AND METHODS FOR TRACKING LOCATION AND MONITORING ENVIRONMENTAL CONDITIONS OF AN ASSET IN TRANSIT

CROSS-REFERENCE TO RELATED APPLICATIONS

This application is a Continuation-in-Part of U.S. patent application Ser. No. 14/856,606 filed on Sep. 17, 2015, the disclosure of which is incorporated herein by reference. This application claims priority to U.S. Provisional Application Ser. No. 62/594,579 filed on Dec. 5, 2017, the disclosure of which is incorporated hereby by reference.

TECHNICAL FIELD

The disclosure relates to systems and methods for real-time tracking of assets that are in in-transit.

BACKGROUND

Various trends in today's society have resulted in a need for rapid and dependable delivery of various types of assets such as medicine, parcels, perishables, packages, etc. Such trends include, for example, consolidation of parts warehouses for economic reasons, just-in-time manufacturing methods, and consumer empowerment which includes internet shopping and the ever-growing need for rapid gratification, etc. These trends have resulted in the establishment and growth of several business concerns whose service is parcel and package delivery by various means including air, rail, ground and sea, with promised transit times (e.g., one-day, priority, etc.) that can be obtained for different service fees.

Business and personal consumers have become dependent on these services, as exemplified by just-in-time manufacturing. Businesses can suffer serious disruption in the event of a lost or delayed shipment. Consumers become anxious or angry when shipments are lost or do not arrive as promised or expected. In order to resolve those concerns in an efficacious manner, shipping companies have come to provide tracking services. Each time a package is handled, a package tracking number or other identifying information (the "package identifier") and the location, time, and date are recorded in a database, often after capture by means of a bar code scanner or other automated method. However, these conventional tracking systems are extremely limited in that they only provide information related to dates and times at which packages have arrived or departed from each facility while in transit from a starting destination to a delivery destination.

SUMMARY

Embodiments of the invention include systems, methods and devices for tracking the location an asset (e.g., package) that is in transit (rail, air, truck, etc.) and monitoring environmental conditions that the asset is subjected to during transit. For example, one embodiment includes a package label, which comprises a flexible substrate comprising a plurality of components disposed on the flexible substrate. The components comprise a processor to control operations of the package label, a memory device, a global positioning system (GPS) device configured to determine a geolocation of the package label, a plurality of sensors configured to determine sensor information, and a wireless communications device. The processor is configured to periodically collect real-time location data from the GPS device and sensor information from the plurality of sensors, at a first predetermined time interval, and store the collected information in the memory device. The wireless communications device is configured to transmit the collected real-time location data and sensor information to a remote service provider for access by registered user of the package label, under control of the processor. The processor is configured to periodically access the real-time location data and sensor information in the memory device and command the wireless communication device to transmit the collected location data and sensor information to the remote service provider at a second predetermined time interval. The plurality of sensors comprises one or more of: a temperature sensor to capture real-time temperature information which comprises at least one of an external ambient temperature surrounding the asset, and a temperature of the asset; a humidity sensor to capture real-time humidity information; an altimeter sensor to capture real-time barometric pressure information; a light sensor to capture real-time light exposure information; and an x-y-z accelerometer to capture real-time motion information.

Another embodiment includes a method for providing an asset tracking and monitoring service by a service provider. The method comprises: receiving monitored information transmitted from a package label affixed to an asset being shipped by a registered user from an origin location to a destination location, wherein the package label comprises a global positioning system (GPS) receiver, and a plurality of sensors comprising a temperature sensor, wherein the monitored information comprises (i) real-time location information obtained from the GPS receiver regarding a current location of the asset, (ii) real-time temperature information obtained from the temperature sensor, wherein the real-time temperature information comprises at least one of an external ambient temperature surrounding the asset, and a temperature of the asset, and (iii) other real-time sensor information obtained from at least one other sensor of the plurality or sensors; storing the received monitored information in a database and associating the received monitored information with a registered user, wherein the received monitored information is associated with the registered user using a unique identifier of the package label which is included in the transmitted information and which is associated with the registered user during a package label provisioning process; rendering and presenting stored monitored information on a computing device of the registered user; maintaining a database of historical transit and package delivery performance information for a shipping carrier utilized by the registered user for shipping assets of the registered user; and analyzing the historical transit and package delivery performance information against time-in-transit information provided by the shipping carrier to determine an effectiveness of the shipping carrier in providing overnight shipping services for assets of the register user; and automatically providing a recommendation to the registered user for utilizing an overnight shipping service of the shipping carrier based on results of said analyzing.

These and other embodiments of the invention will be described in the following detailed description of embodiments, which is to be read in conjunction with the accompanying figures.

BRIEF DESCRIPTION OF THE DRAWINGS

FIG. 13 illustrates various notification icons which can be utilized to provide notice to a customer regarding potential delays in delivery of an asset of the customer, according to embodiments of the invention.

DETAILED DESCRIPTION OF EMBODIMENTS

Figure 1:
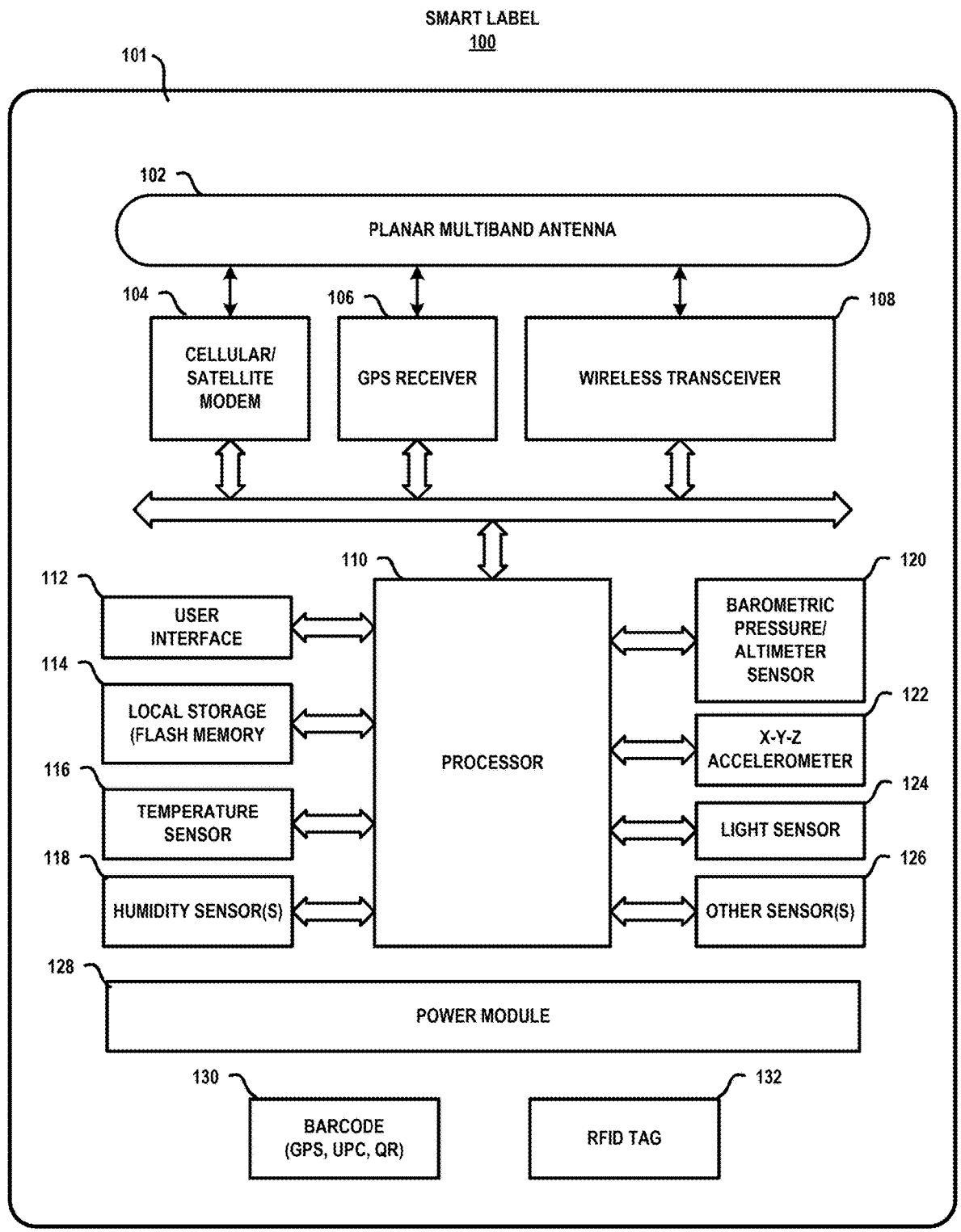
FIG. 1 is a schematic view of a shipping label that is configured for tracking a location of an asset in transit and monitoring environmental conditions during transit, according to an embodiment of the invention.

Embodiments of the invention will now be discussed in further detail regarding systems and methods for tracking the location of an asset (e.g., package) that is in transit (rail, air, truck, etc.) and monitoring environmental conditions that the asset is subjected to during transit. For example, FIG. 1 is a schematic view of a shipping label 100 (or "smart" label) that is configured for tracking a location of an asset in transit and monitoring environmental conditions during transit, according to an embodiment of the invention. The shipping label comprises a plurality of electronic components and circuitry, which are either affixed to or printed on, a flexible substrate 101. In the exemplary embodiment shown in FIG. 1, the shipping label comprises a planar multiband antenna 102, a cellular/satellite modem 104, a global positioning system (GPS) receiver 106, a wireless transceiver 108, a processor 110, a user interface 112, a local storage device 114, a temperature sensor 116, a humidity sensor 118, a barometric pressure (or altimeter) sensor 120, an x-y-z accelerometer 122, a light sensor 124, one or more other types of sensors 126, a power module 128, a printed barcode 130, and an radio frequency identification (RFID) tag 132.

In general, the modem 104 allows the smart label 100 to communicate (over one or more communications networks) with a remote computing platform of a service provider (e.g., computing platform 330, FIG. 3) which provides an asset tracking and monitoring service as discussed in further detail below. The type of modem that is utilized will vary depending on the type of transport vehicle that is utilized to transport a given asset. For example, for air transport via an airplane, the modem 104 will comprise a satellite modem to enable the smart label 100 to communicate with the service provider system using a satellite communications network. For land transport (via rail or truck, for example), the modem 104 will comprise a cellular modem to enable the smart label to communicate with the service provider system using a cellular network (e.g., Cellular 3G/4G network service).

The GPS receiver 106 is configured to receive radio signals that are broadcast from a plurality of global positioning satellites in a GPS satellite system, wherein the radio signals broadcast from a given GPS satellite include location information of the given GPS satellite and the time the signal was sent. The GPS receiver 106 is configured to perform a trilateration process to determine the position of the smart label 100 using the radio signal information received from a plurality of GPS satellites. The GPS receiver 106 is configured to communicate with the GPS satellite system at a predefined time intervals, and receive and process the received radio signal information from multiple GPS satellites to determine the geographic coordinates of the smart label 100 at each predefined time interval. The GPS receiver 106 temporarily stores the location information, until it is accessed by the processor 110 as discussed below. The GPS receiver 106 also tracks a number of satellites that were utilized to compute a given location at a given time and mathematically compute an HDOP (Horizontal Dilution of Position) value from the position of the GPS satellites used to compute the geographical coordinates of the determined location. The HDOP value provides a measure of the level of accuracy that can be achieved for determining the GPS location based on the current satellite positions.

In another embodiment, the smart label 100 can utilize A-GPS (Assisted Global Positioning System) to determine location information. While the GPS receiver 106 determines location by directly communicating with GPS satellites moving around the earth, an A-GPS device determines location information from network stations based on GSM, CDMA or LTE technology employed in the mobile terminal.

Base station systems in the A-GPS technology in turn communicate with a satellite(s) and keep the information ready and provide the information to the mobile terminals upon request. Since the GPS receiver 106 is communicating with satellites, the GPS receiver 106 can only obtain information under clear sky conditions and when the satellites are reachable without any interference. On the other hand, an A-GPS device communicates with network base stations, and can obtain information in a cloudy atmosphere. In this regard, both GPS and A-GPS technologies can be implemented by the smart label to ensure proper location tracking functions.

In other embodiments, the location of the smart label 100 can be determined using cell tower strength information to triangulate the position of smart label 100. As in known in the art, a cellular network is distributed over land areas called cells, each served by at least one fixed-location transceiver, known as a cell site or base station. The cellular modem 104 can communicate with local cell towers connected to a base station in given "cell", and estimate a current location of the smart label 100 by measuring the signal strength differences between multiple cell towers, using known methods.

The wireless transceiver 108 can be utilized for various purposes. For example, as explained in further detail below, the wireless transceiver 108 can be configured to communicate with remote sensor devices which are not present on the smart label 100, but which are located at strategic locations within or on a given asset being tracked. For example, a temperature sensor device with small wireless transceiver (e.g., a Bluetooth or near field communication (NFC) transceiver) can be disposed or otherwise located within a given package or container to monitor the internal temperature within the given package or container, and wirelessly transmit temperature information to the smart label 100. In another embodiment, the wireless transceiver 108 can be configured to communicate with a local wireless hotspot transceiver (e.g., wireless modem) which is locally disposed (e.g., disposed within a transport vehicle) and configured to communicate with wireless transceiver 108 on the smart label 108 and to communicate information between the service provider and the smart label 100. The wireless transceiver 108 can be implemented using standard or proprietary wireless protocols. For example, in one embodiment, the wireless transceiver can be implemented using the standard Wi-Fi 802.11 networking standards. In another embodiment, the wireless transceiver can be implemented using Bluetooth.

The user interface 112 is configured to activate or deactivate operations of the smart label 100. The user interface 112 can be configured using various techniques depending on the form factor of the smart label 100. For example, the user interface 112 may comprise a touch sensitive surface, or mechanical buttons, etc., to provide user controls for activating and deactivating the operation of the smart label 100.

The local storage device 114 may comprise any suitable type of non-volatile memory to provide persistent storage for software routines that are executed by the processor 110 for executing functions of the smart label 100 as discussed herein, and for storing sensor data that is periodically collected from the various sensors 116, 118, 120, 122, 124, and 126 before being uploaded to the service provider for processing and reporting to a registered user or entity that is utilizing the smart label for real-time tracking of assets in transit. In addition, the local storage device 114 stores label configuration data which is utilized to provision the smart label 100, enable/disable the collection of sensor data from different sensors, and/or set control parameters to control functionalities of the smart label 100 which are executed by the processor 110. The local storage device 114 can be implemented using a flash memory device, a SSD (solid state drive) device, or other types and combinations of non-volatile memory devices, which are suitable for the given application.

The temperature sensor 116 is configured to detect the temperature of the asset to which the smart label 100 is attached, or otherwise to detect an ambient temperature of the environment surrounding the smart label 100 and the associated asset at predetermined intervals during transit. The humidity sensor 118 is configured to detect a humidity level of the environment surrounding the smart label 100 and the associated asset at predetermined intervals during transit. The barometric pressure sensor 120 (or barometric altimeter sensor) is configured to determine an altitude of the smart label 100 and the associated asset based on a measurement of atmospheric pressure. The x-y-z accelerometer 122 comprises an electromechanical device that is configured to sense ether static forces (e.g., gravity) or dynamic forces of acceleration (vibrations and movement in three dimensions). The light sensor 124 comprises one or more of photoresistors, photodiodes, phototransistors, etc., which are configured to detect an ambient light level (brightness, darkness) of the environment surrounding the smart label 100 and the associated asset. The other sensors 126 include other types of sensors that may be useful in monitoring environmental conditions and other events which can affect the quality of the asset during transit.

The processor 110 executes program code that is stored in the local storage device 114 and/or an internal memory of the processor 110 to control functions of the smart label 100 such as collecting sensor data from the various sensors, accessing GPS data (e.g., geographic location information) from the GPS receiver 106, storing the sensor and GPS data in the local storage 114, and periodically transmitting the collected sensor and GPS data to the remote service provider using the modem 104.

The power module 120 comprises a printed or thin-film power supply device and voltage regulator circuitry to provide regulated DC power for operating the various components of the smart label 100.

The planar multiband antenna 102 comprises an array of printed antennas and transmission lines which are configured to capture wireless radio signals that are input to and processed by the modem 104, the GPS receiver 106, and the wireless transceiver, and to transmit wireless radio signals generated by the modem 104 and the wireless transceiver 108 to transmit information to a remote node. The planar multiband antenna 102 comprises different antennas that are configured to capture and transmit wireless signals at the operating frequencies of the modem 104, the GPS receiver 106, and the wireless transceiver 108.

The bar code 130 comprises any static one-dimensional or multi-dimensional bar code such as a UPC (Universal Product Code) barcode or a QR code (Quick Response Code). In one embodiment, the bar code 130 is generated and integrated as part of the smart label 100 as a means to uniquely identify the smart label 100, and to encode of information that is useful for asset tracking purposes.

In one embodiment, the RFID tag 132 comprises a passive RFID tag which is programmed with a specific TAG code that uniquely identifies the smart label 100, and which can be accessed by a RFID interrogator (reader) device. The RFID tag 132 comprises an embedded chip and antenna. An RFID reader is utilized to access the TAG code and other information which may be stored in the RFID tag 132 using known systems and methods. In one embodiment, the RFID tag 132 is a printed device that can be picked off of a roll of RFID tags and adhered to a surface of the smart label 100.

As noted above, the various components of the smart label 100 may be separate components that are attached to the flexible substrate 101 and/or formed and printed on the flexible substrate 101 using known thin-film and flexible printed circuit technologies. In one embodiment, the active circuitry and sensors are constructed using state of the art thin-film and/or printed circuit technologies and other suitable fabrication technologies to fabricate thin-profile package labels comprising the active circuitry and various sensors, as shown in FIG. 1. The flexible substrate 101 may comprise any plastic flexible substrate material, such as polyimide, or other materials which are suitable for the given application. The smart label 100 can be protected by a thin coating of weather proof material such as Tyvek material or any suitable thermoplastic coating such as high-density polyethylene (HDPE) or polyethylene high-density (PEHD).

The service provider can differentiate between different smart labels using different techniques. For example, when the smart label 100 is configured with the modem 104 (cellular and/or satellite), the modem 104 will have a globally unique mobile equipment identifier (MEID) or International Mobile Equipment Identity (IMEI), which uniquely identifies the given modem 104 and, thus, the smart label 100 which comprises the given modem 104. In addition, the unique identification codes associated with the static barcode 130 and the RFID tag 132 can be used to uniquely identify the given smart label for asset tracking and monitoring services as discussed herein.

Figure 2A:
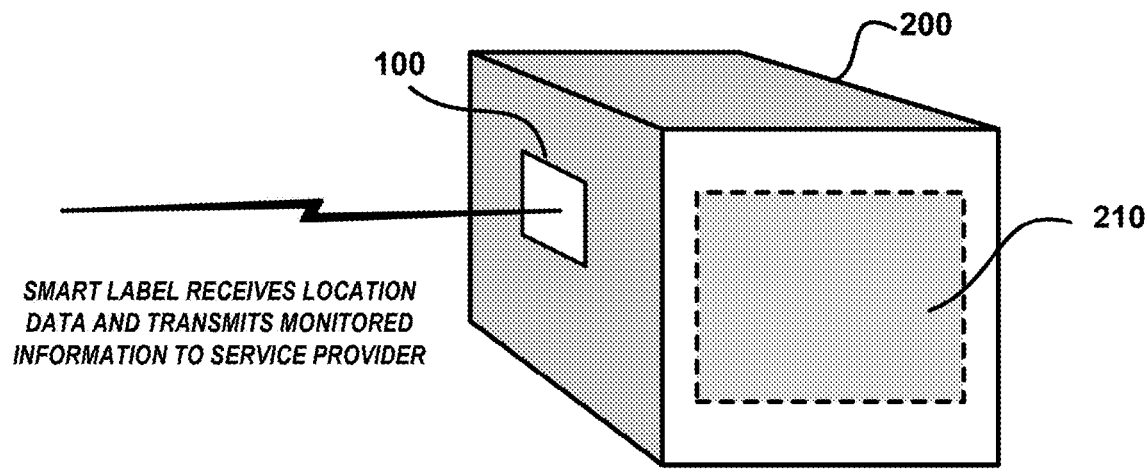
FIG. 2A schematically illustrates a method for utilizing a shipping label to track a location and environmental condition for an asset in transit, according to an embodiment of the invention.

FIG. 2A schematically illustrates a method for utilizing a shipping label to track the location and environmental conditions of an asset in transit, according to an embodiment of the invention. In particular, FIG. 2A illustrates the smart label 100 affixed to a package or container 200 which contains certain assets 210 that are being shipped by air, rail or ground. In this example embodiment, the smart label 100 is configured to receive location data via GPS or A-GPS tracking, as discussed above, and obtain monitored sensor information from one or more active sensors on the smart label 100, and then transmit the location and monitored sensor information to the service provider using the cellular or satellite modem 104, for example. In other embodiments, the smart label 100 will utilize the wireless transceiver 108 to transmit the location and monitored sensor information to a local access point on the transport vehicle (e.g., a local modem or wireless transceiver of a wireless local area network (WLAN), etc.), which is then configured to transmit the location and monitored sensor information to the service provider.

Figure 2B:
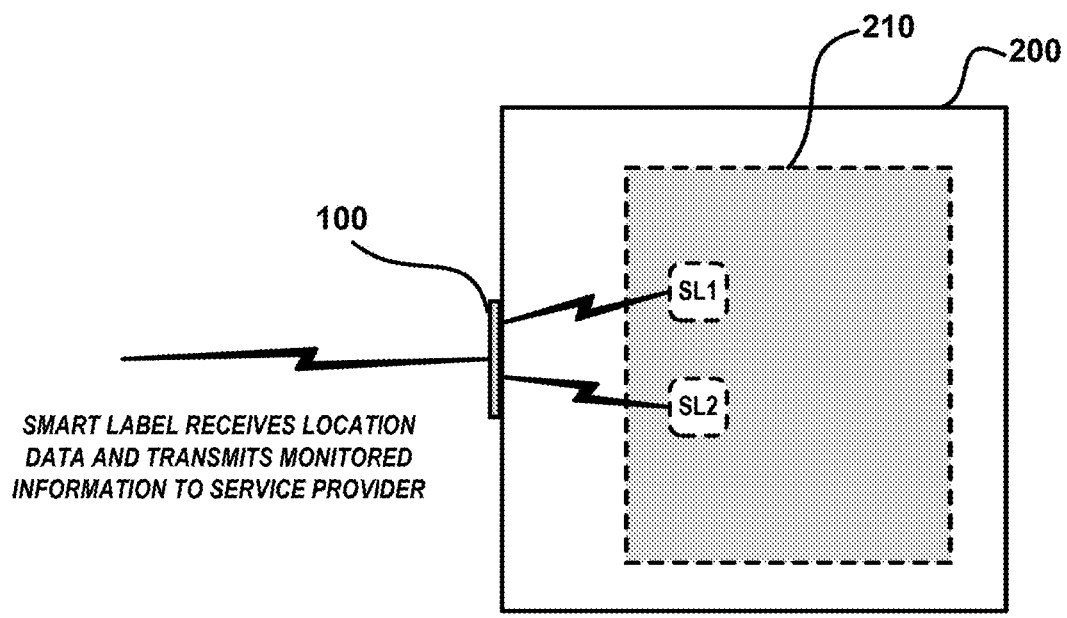
FIG. 2B schematically illustrates a method for utilizing a shipping label to track a location and environmental condition for an asset in transit, according to another embodiment of the invention.

FIG. 2B schematically illustrates a method for utilizing a shipping label to track a location and environmental condition for an asset in transit, according to another embodiment of the invention. Similar to FIG. 2A, the example embodiment of FIG. 2B illustrates the smart label 100 affixed to a package or container 200 which contains certain assets 210 that are being shipped by air, rail, ground or sea. In this example embodiment, the smart label 100 is configured to receive location data via GPS or A-GPS tracking, as discussed above, and obtain monitored sensor information from one or more active sensors that are located on the smart label 100, as well as one or more remote sensors SL1 and SL2 (thin film/printed sensor labels) that are disposed within the package 200 and affixed directly on or within the assets 210.

With this embodiment, the remote sensors SL1 and SL2 would have embedded wireless transceivers and antennas to enable the remote sensors SL1 and SL2 to wirelessly communicate with the smart label 100 and transmit the sensor information to the smart label 100 (via the wireless transceiver 108) under control of the processor 110.

The remote sensors SL1 and SL2 can be temperature sensors, humidity sensors, or light sensors, for example, to monitor the internal environment of the package enclosure 200 (as compared to monitoring the external ambient conditions) and/or to monitor certain conditions (e.g., temperature) on or within the asset This may be useful in circumstances where the assets being shipped (e.g., perishables, food, medication, etc.) can be damaged or degraded by exposure to excessive light, humidity, temperature, etc., wherein monitoring of the internal environment within the package 200 is more important than monitoring the external environment. For example, many pharmaceutical products or food products are temperature sensitive, and the use of temperature monitoring sensor labels during the shipment or medication, produce, or other food products will provide insight as to whether the products have been subjected to excessive temperatures and thus potentially damaged, hazardous, or dangerous.

In the example embodiment of FIG. 2B, the smart label 100 will receive the location data, and the monitored sensor information from one or more active sensors that are located on the smart label 100, and the one or more remote sensors SL1 and SL2, and transmit the location and monitored sensor information to the service provider using the cellular or satellite modem 104, for example, or otherwise utilize the wireless transceiver 108 to transmit the location and monitored sensor information to a local access point on the transport vehicle, which then transmits the location and monitored sensor information to the service provider.

Figure 3:
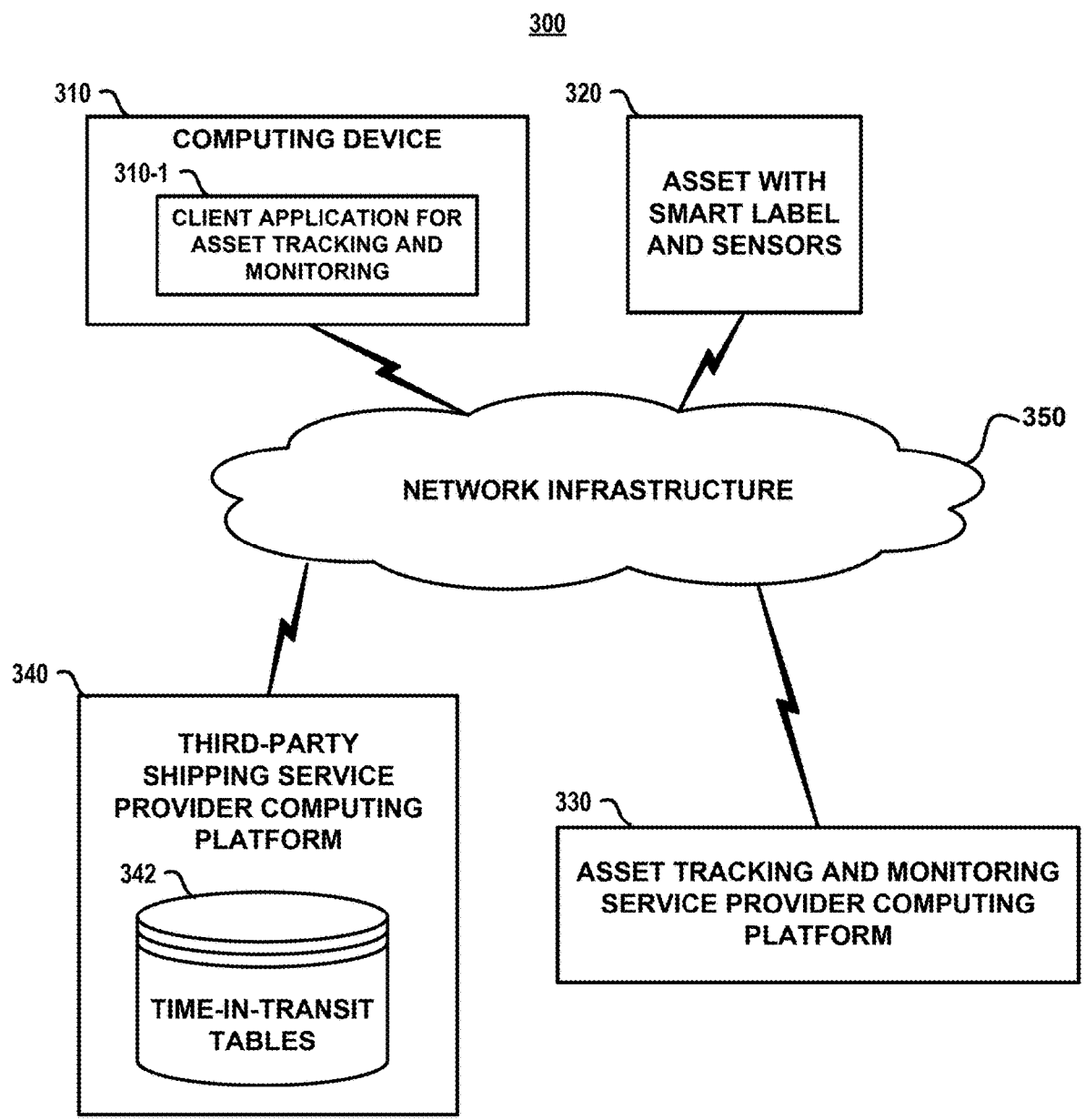
FIG. 3 schematically illustrates a computing system which is configured for tracking a location and monitoring environmental conditions of an asset during transit, according to an embodiment of the invention.

FIG. 3 schematically illustrates a system 300 which is configured for tracking a location and monitoring environmental conditions of an asset during transit, according to an embodiment of the invention. The system 300 comprises a customer computing device 310, an asset with a smart label and sensors 320, a computing platform of an asset tracking and monitoring service provider 330, and a computing platform of the third-party shipping service provider 340, which are all network connected over a communications network 350. The customer computing device 310 comprises a client application 310-1 which is configured to communicate with a server application of the service provider computing platform 330 to obtain real-time location and sensor information for the customer asset 320 which is in-transit and being tracked and monitored. The customer computing device 310 can be any type of computing device such as a smart phone, a smart watch, an electronic tablet, a laptop computer, a desktop computer, etc., which is configured to execute the client application 310-1 and communicate with the asset tracking and monitoring service provider computing platform 330 over the communications network 350. The communications network 350 may comprise any type of communications network (or combinations of networks), such as a global computer network (e.g., the Internet), a wide area network (WAN), a local area network (LAN), a satellite network, a telephone or cable network, a cellular network, a wireless network such as Wi-Fi or WiMAX, or various portions or combinations of these and other types of networks.

The third-party shipping service provider computing platform 340 represents an on-line service that is provided by a third-party shipping service such as UPS (United Parcel Service), FedEX, DHL, U.S. Postal Service, etc. In one embodiment, the third-party shipping service provider 340 is a separate entity from the asset tracking and monitoring service provider 330, wherein the third-party shipping service provider 340 will transport the customer asset 320 with a smart label and sensors, but wherein the asset tracking and monitoring service provider 330 supplies the smart labels to the customers and provides the asset tracking and monitoring service for assets being shipped by the third-party shipping service provider 340. In another embodiment, the asset tracking and monitoring service provider 330 provides shipping services for customer assets as well as asset tracking and monitoring services for in-transit assets. In yet another embodiment, the third-party shipping service provider 340 integrates and implements an asset tracking and monitoring service as discussed herein.

The third-party shipping service provider computing platform 340 comprises and maintains a database of time-in-transit tables 342. The third-party shipping service provider 340 will typically have each shipping zone broken down based on a given service (overnight, express, standard, etc.), which provides an indication of how long it will take for a package to be shipped to a target destination using a one-day service. For example, overnight time-in-transit information specifies different "delivery commit areas" for different geological locations, wherein each different delivery commit area is associated with a given "commit time" at which an overnight delivery is guaranteed to be delivered (or the customer will be refunded for the cost of the overnight service), based on the shipping date/time and the ZIP code of the target destination. For example, depending on the location of the distribution facilities of the shipping service provider, a given geolocation (e.g., ZIP Code) may have three different delivery commit regions which have respective commit times of 10:30 am, 12:00 pm, or 4:30 pm, for express overnight delivery of a package. The asset tracking and monitoring service provider 330 will access and utilize the information contained in the database of time-in-transit tables 342 to compare the time-in-transit information to actual delivery performance to determine how effective the shipping service is in providing the overnight services, and provide smart recommendations to a customer regarding the efficacy of the customer's use of overnight shipping services from a given shipping service provider.

Figure 4:
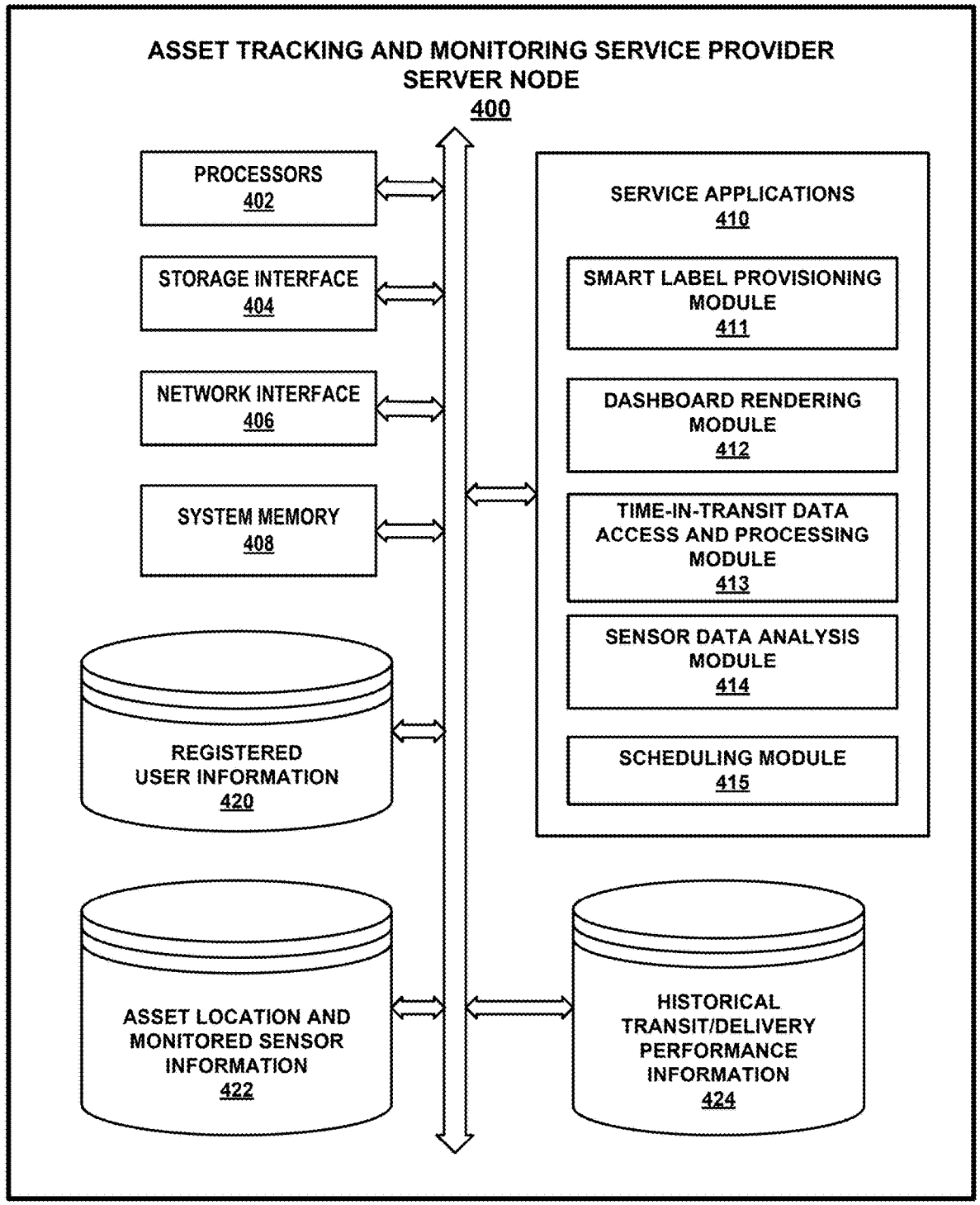
FIG. 4 schematically illustrates a computing node of a computing platform of an asset tracking and monitoring service provider, according to an embodiment of the invention.

FIG. 4 schematically illustrates a computing node 400 of a computing platform of an asset tracking and monitoring service provider, according to an embodiment of the invention. The server node 400 comprises processors 402, storage interface circuitry 404, network interface circuitry 406, system memory 408, a plurality of service applications 410, a database of registered user information 420, a database of asset location and monitored sensor information 422, and a database of historical transit/delivery performance information 424. The service applications 410 comprise a smart label provisional module 411, a dashboard rendering module 412, a time-in-transit data access and processing module 413, a sensor data analysis module 414, and a scheduling module 415.

In one embodiment, the various system modules 411, 412, 413, 414, and 415 comprise software modules that are persistently stored in a storage device, and loaded into the system memory resources 408, and executed by the processor 402 to perform various functions as described herein. In this regard, the system memory 408 and other memory or storage media as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

The processors 402 may comprise one or more processors that are configured to process program instructions and data to execute a native operating system (OS) and applications that run on the server node 400. For example, the processors 402 may comprise one or more of a computer processor, a microprocessor, a microcontroller, an application-specific integrated circuit (ASIC), a field programmable gate array (FPGA), and other types of processors, as well as portions or combinations of such processors. The term "processor" as used herein is intended to be broadly construed so as to include any type of processor that performs processing functions based on software, hardware, firmware, etc. The storage interface circuitry 404 enables the processors 402 to interface and communicate with the system memory 408, and other local or remote storage systems. The network interface circuitry 406 enables the server node 400 to interface and communicate with a network and other system components. The network interface circuitry 406 may comprise one or more network interface cards, I/O adaptors, etc. The system memory 408 comprises electronic storage media such as random-access memory (RAM), read-only memory (ROM), or other types of memory, in any combination. The term "memory" or "system memory" as used herein refers to volatile and/or non-volatile memory which is utilized to store application program instructions that are read and processed by the processors 402 to execute a native operating system and one or more applications/programs hosted by the server node 400, and to temporarily store data that is utilized and/or generated by the native OS and application programs running on the server node 400.

While the computing node 400 is generically illustrated in FIG. 4 for illustrative purposes, it is to be understood that the various system modules 411, 412, 413, 414, and 415 may be distributed over a plurality of computing nodes (e.g., a cluster of servers, virtual machines, etc.) that collectively operate to implement the functions described herein. In addition, the various databases 420, 422, and 424 may be implemented using any suitable type of database system (e.g., structured query language (SQL), non-SQL, etc.) and/or supported by any suitable data storage system or combination of data storage systems, including, but not limited to storage area network (SAN) systems, direct attached storage (DAS) systems, a serial attached storage (SAS/SATA) system, as well as other types of data storage systems comprising clustered or distributed virtual and/or physical infrastructure. In this regard, the asset tracking and monitoring service provider computing platform 330 (FIG. 1) and associated server node 400 (FIG. 4) may be implemented in a data center or be a cloud computing platform that performs data computing and data storage functions to provide asset tracking and monitoring services to multiple end users, service providers, and/or organizations.

The smart label provisioning module 411 implements methods that allow a customer to provision a given smart label which is to be used for tracking and monitoring an asset of the customer. The dashboard rendering module 412 is configured to generate graphical user interfaces (e.g., FIGS. 7-12) to present real-time tracking and sensor information to customers. The time-in-transit data access and processing module 413 is configured to access time-in-transit information from the on-line databases of third party shippers (e.g., database 342, FIG. 3) and compare the time-in-transmit information against actual performance and provide smart recommendations to customers. The sensor data analysis module 414 is configured to process sensor data that is transmitted from smart labels of registered customers and perform sensor data computations that are utilized by the dashboard rendering module 412 to present the information to a customer. The sensor data analysis module 414 is further configured to analyze the sensor data and generate notifications to customers upon the occurrence of certain pre-defined events. The scheduling module 415 is configured to allow a customer to schedule a time and place for a third-party shipping service to pick up a package from a customer location and deliver the package to a target destination.

The database 420 comprises relevant information regarding registered users/customers of the asset tracking and monitoring service provider 330. Such information includes, for example, customer name, address, billing information, preferences, etc. The database 422 comprises real-time asset location and monitored sensor information of customer assets that are transmitted by smart labels affixed to assets that are in transit and being tracked and monitored by the service provider 330. The database 424 comprises historical transit and delivery performance information which is utilized by, e.g., the time-in-transit data access and processing module 413 to determine if the actual delivery performance matches the information contained in the time-in-transit tables of a given third-party shipper.

For example, assume that a given entity (e.g., product manufacturer/distributer) regularly uses a given type of overnight service to deliver products to a given customer (e.g., garment delivery to a retailer), wherein the overnight service guarantees delivery at a given "commit time" of 8:30 am based on the time-in-transit tables of a given shipper. Assume further that the products are always delivered on time to the given customer (e.g., on or before commit time of 8:30 am), but that the products are typically not actually offloaded at the target location because there is no one present to sign and accept delivery at the "commit time," thereby resulting in the products being re-delivered at a later time in the day when persons are present to sign and accept delivery. In this instance, the time-in-transit data access and processing module 413 can generate a smart recommendation to the given entity to recommend using a cheaper overnight service with a later commit time (e.g., 4:40 pm), as the given entity (or recipient) is not benefiting from using the more expensive overnight delivery service with an earlier commit-time (e.g., 8:30 am). As another example, assume that a given customer regularly uses a given type of overnight service to deliver assets to a recipient at a target location, but that the assets are typically received at the target location later than that guaranteed "commit time". In this example, the time-in-transit data access and processing module 413 can provide alerts to the given customer to notify the given customer that the shipping service is not meeting its guaranteed "commit time" of delivery, thereby allowing the given customer to obtain refunds for the service. The time-in-transit data access and processing module 413 can generate a smart recommendation to the customer to not utilize such service or recommend another service which is compatible with the needs or desired of the customer.

Figure 5A:
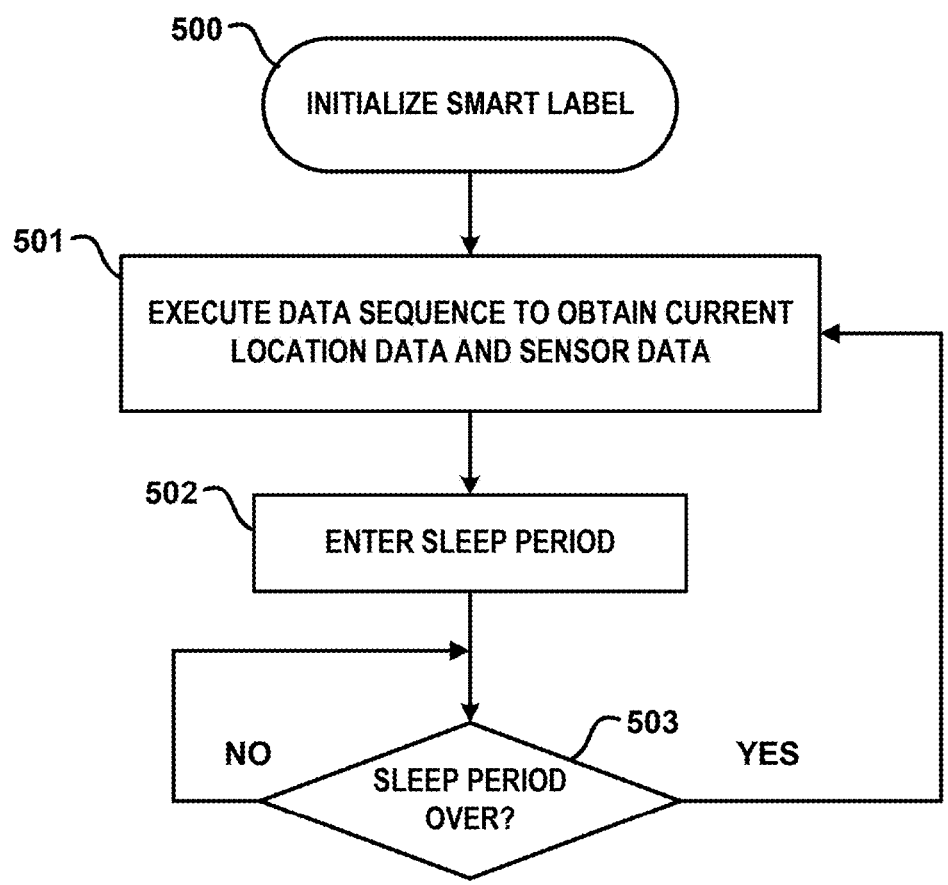
FIGS. 5A and 5B illustrate a flowchart of a method for tracking a location and monitoring environmental conditions of an asset during transit, according to an embodiment of the invention.
Figure 5B:
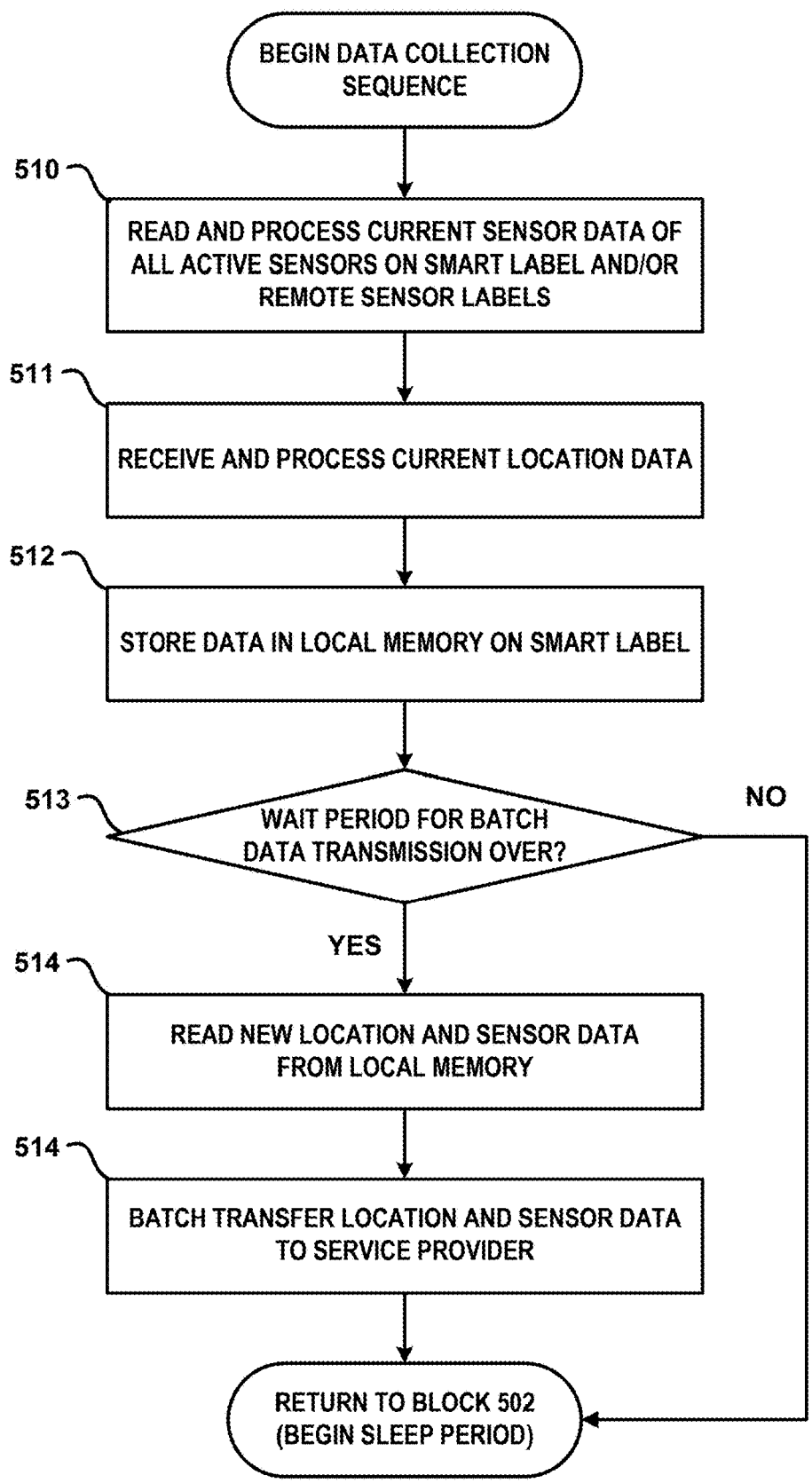

FIGS. 5A and 5B illustrate a flowchart of a method for tracking a location and monitoring environmental conditions of an asset during transit, according to an embodiment of the invention. For illustrative purposes, the process flow of FIGS. 5A and 5B will be discussed in the context of the example embodiments of FIGS. 1-4, as discussed above. When a customer wishes to ship a given asset to a target recipient while tracking the location and environmental conditions in real-time, the customer will affix the smart label 100 to the asset and initialize the smart label 100 (block 500). As some point subsequent to the initialization, the processor 110 of the smart label 100 beings to execute a data sequence to obtain and store current location information and sensor data (block 501). This process is periodically repeated at predefined time intervals (e.g., every 15 minutes, every 30 minutes, every hour, etc.) from the time that the smart label is activated and placed on the given asset, to the time that the asset is delivered to the target recipient/destination and deactivated. After each data acquisition sequence, the smart label 100 enters a sleep mode (block 502). Upon expiration of the sleep period (affirmative determination in block 503), the processor 110 of the smart label 100 begins to execute a next data sequence to obtain and store current location information and sensor data (block 501).

FIG. 5B illustrates a process flow for the data collection process of block 501. The processor 110 of the smart label 100 will read and process current sensor data of all active sensors on the smart label 100 and/or remote sensor labels that are affixed to the asset (as discussed above) (block 510). The processor 110 will also receive and process current location data from, e.g., the GPS receiver 106 (block 511). The processor 110 will then store the sensor and location data in the local storage 114 on the smart label 100 (block 512).

The processor 110 will then determine if a wait period for batch data transmission has expired (block 513). If the wait period has expired (affirmative determination in block 513), the process will access the location and sensor data from the local storage 114 (block 514), and batch transmit the location and sensor data for upload to the asset tracking and monitoring service provider 330 (block 514). In one embodiment, the wait period for batch transmission in the same as the wait period for data collection so that when the smart label 100 performs a data acquisition cycle to obtain and store current location and sensor data, the newly acquired data will be batch transmitted for upload to the service provider at the end of the data acquisition cycle. In another embodiment, the batch transmission wait period is longer than the data acquisition wait period such that there can be two or more data acquisition cycles that are performed prior to batch transmission of the collected data.

Figure 6:
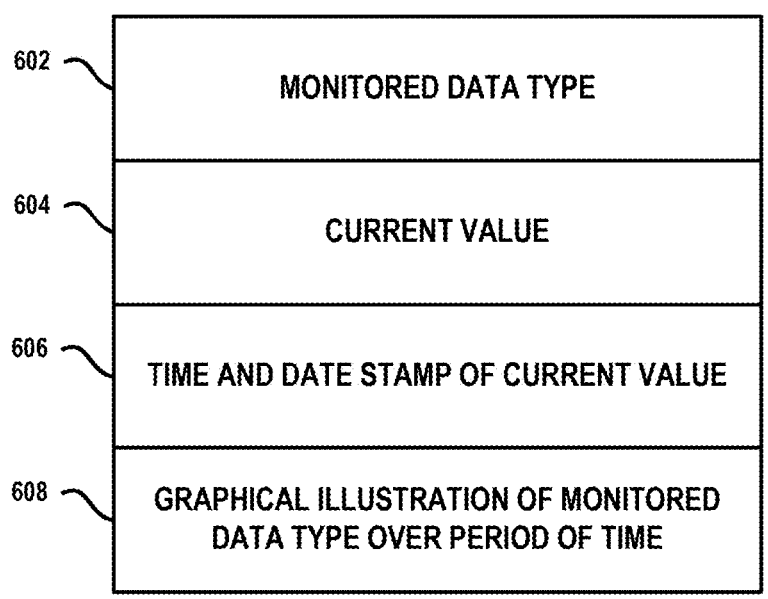
FIG. 6 is a high-level depiction of user interface of a dashboard which is configured to present information to a customer regarding location and environmental conditions during transit of an asset of the customer, according to an embodiment of the invention.

FIG. 6 is a high-level depiction of user interface 600 of a dashboard which is configured to present information to a customer regarding location and environmental conditions during transit of an asset of the customer, according to an embodiment of the invention. The user interface 600 renders and presents monitored information (e.g., location information and sensor information) in some structured format which includes, for example, an indication of a monitored data type 602 (e.g., GPS data, temperature data, etc.), a most recent (current) determined value 604 of the given data type, a time stamp and data of the most current value 606 (recent activity, or most recent recorded/measured/computed value), and a graphical illustration of the monitored data type over a period of time 608. FIGS. 7, 8, 9, 10, 11, and 12 provide example user interfaces which are based on the user interface format of FIG. 6.

Figure 7:
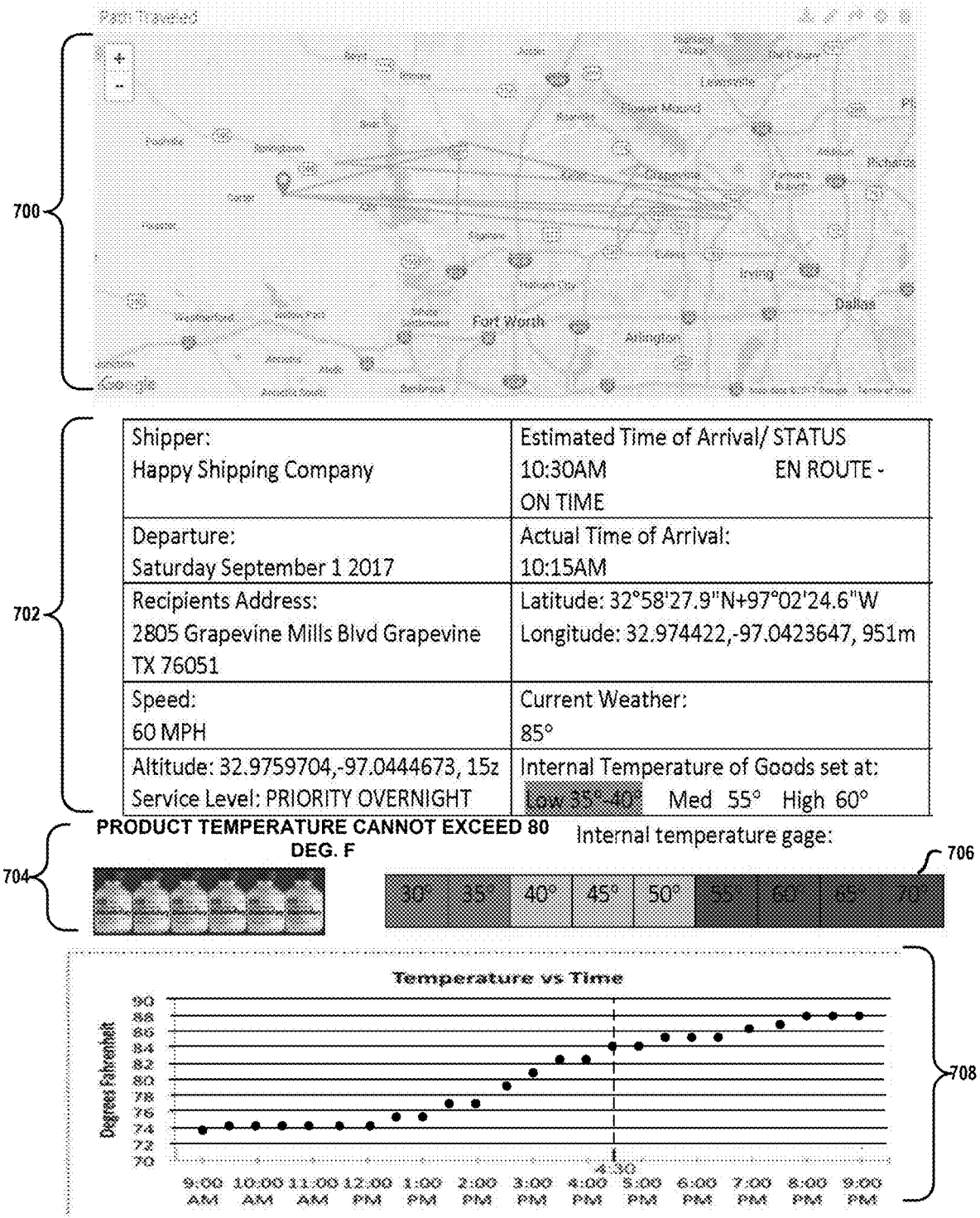
FIG. 7 illustrates an example user interface of a dashboard which presents information regarding the location and temperature of an asset over a period of time in which the asset is in transit, according to an embodiment of the invention.

For example, FIG. 7 illustrates an example user interface of a dashboard which presents information regarding the location and temperature of an asset over a period of time in which the asset is in transit, according to an embodiment of the invention. The user interface comprises a map 700 which shows a path (ground) in which an asset in-transit has traveled along a route that is tracked by location information. An information block 702 illustrates various types of information associated with the asset in transit. A product block 704 identifies the given asset being tracked. A user interface item 706 allows a customer to set a temperature value for providing an alert notification to the customer if the temperature of the asset, which is being tracked in real-time, exceeds or falls below a predefined temperature. The user interface shown in in FIG. 7 further provides a graphical illustration 708 of temperature that is tracked over time. The graph 708 provides an example embodiment in which a target temperature level of 80 degrees F. is set by a given customer to provide an alert notification, wherein an alert will be generated and pushed to a computing device of the customer (at 4:40 pm) to notify the customer that the temperature of the assets being track has reached or exceeded the predefined temperature level of 80 degrees F.

In other embodiments, the user interface allows a user to set threshold values for one or more additional environmental conditions or events, such as humidity, light exposure, motion, altitude, HDOP, etc., which are being tracked in real-time during transit of a given asset, and allow the user to select and option of having alert notifications "pushed" to a computing device of the user to provide real-time notification that a given asset of the user, which is in transit, may be exposed to conditions that are detrimental to the given asset (e.g., high temperature or light exposure to a given asset which can damage the asset, etc.)

Figure 8:
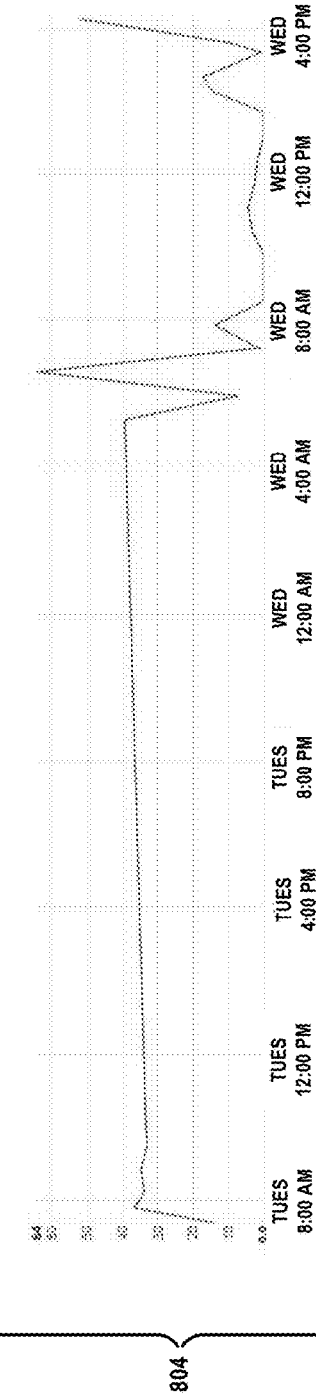
FIG. 8 illustrates an example user interface of a dashboard which presents distance traveled information regarding a distance that a given asset has traveled over a given period during transit, according to an embodiment of the invention.

FIG. 8 illustrates an example user interface 800 of a dashboard which presents distance traveled information regarding a distance that a given asset has traveled over a given period during transit, according to an embodiment of the invention. The user interface 800 includes a block 802 that provides a current value of the distance traveled, wherein the current value is computed as the difference between a current detected location of a given asset, and a previously detected location of the given asset in transit. A block 804 provides a graphical illustration of the distance traveled by the given asset in transit. Each point in time of the graph (x-axis) represent a time at which a current location of the asset was determined, and a distance traveled value (y-axis) at each point represents a differential value between a current location detected at that point, and a previous location detected at a previous point. A block 806 provides raw data associated with the distance traveled data, including date stamp, time stamp, geolocation coordinates (latitude/longitude), and computed differential distance traveled. In one exemplary embodiment, the time stamp information is expressed in a local time within a time zone defined by its offset (difference) from the Coordinated Universal Time (UTC) world time standard (e.g., UTC—5.0 hours).

Figure 9:
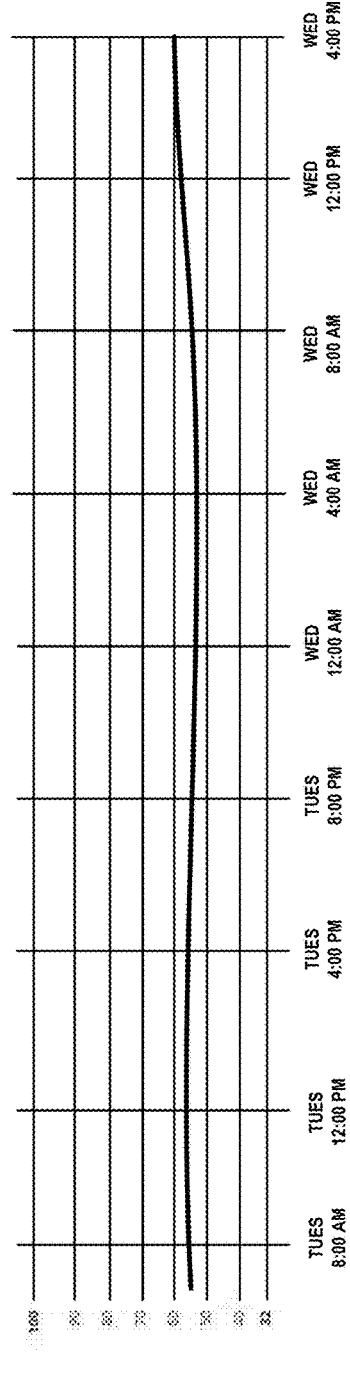
FIG. 9 illustrates an example user interface of a dashboard which presents external temperature information regarding an external ambient temperature which a given asset is subjected to over a given period during transit, according to an embodiment of the invention.

FIG. 9 illustrates an example user interface 900 of a dashboard which presents external temperature information regarding an external ambient temperature which a given asset is subjected to over a given period during transit, according to an embodiment of the invention. The user interface 900 includes a block 902 that provides a current value of the external temperature that is detected using a temperature sensor on the smart label. A block 904 provides a graphical illustration of the external temperature of the given asset over a period of time in transit. Each point in time of the graph (x-axis) represent a time at which a current temperature reading was obtained, and the temperature value (y-axis) at each point represents the temperature that was recorded by the temperature sensor at that point. A block 906 provides raw data associated with the temperature readings including, date stamp, time stamp, and temperature value.

Figure 10:
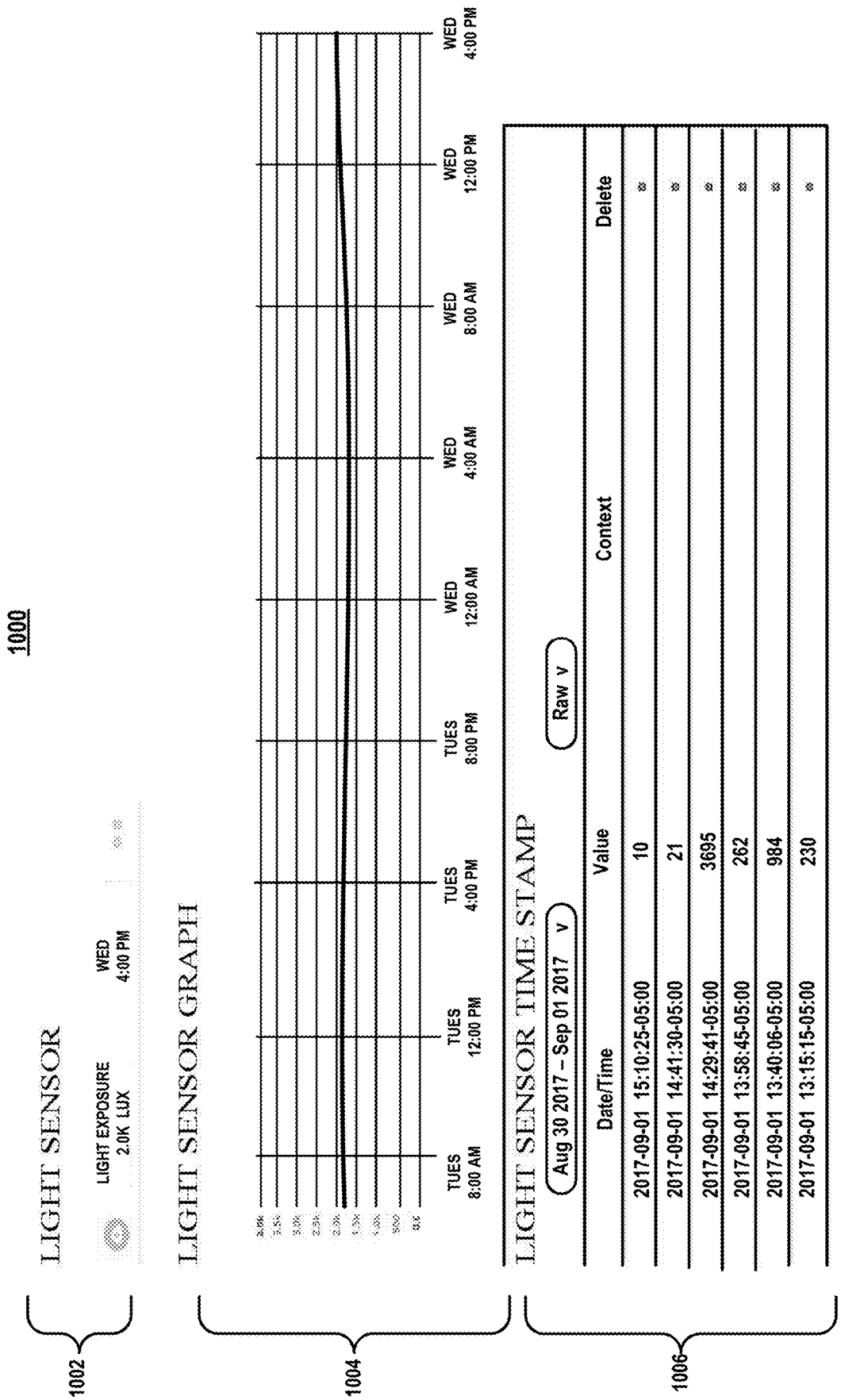
FIG. 10 illustrates an example user interface of a dashboard which presents light exposure information regarding a level of light exposure of a given asset over a given period during transit, according to an embodiment of the invention.

FIG. 10 illustrates an example user interface 1000 of a dashboard which presents light exposure information regarding a level of light exposure of a given asset over a given period during transit, according to an embodiment of the invention. The user interface 1000 includes a block 1002 that provides a current value of the light (lumens) that is detected using a light sensor on the smart label. A block 1004 provides a graphical illustration of the light exposure of the given asset over a period of time in transit. Each point in time of the graph (x-axis) represents a time at which a current light value reading was obtained, and the light value (y-axis) at each point represents the amount of light (in lumens) that was recorded by the light sensor at that point. A block 1006 provides raw data associated with the light sensor readings including, date stamp, time stamp, and light exposure value (e.g., LUX).

Figure 11:
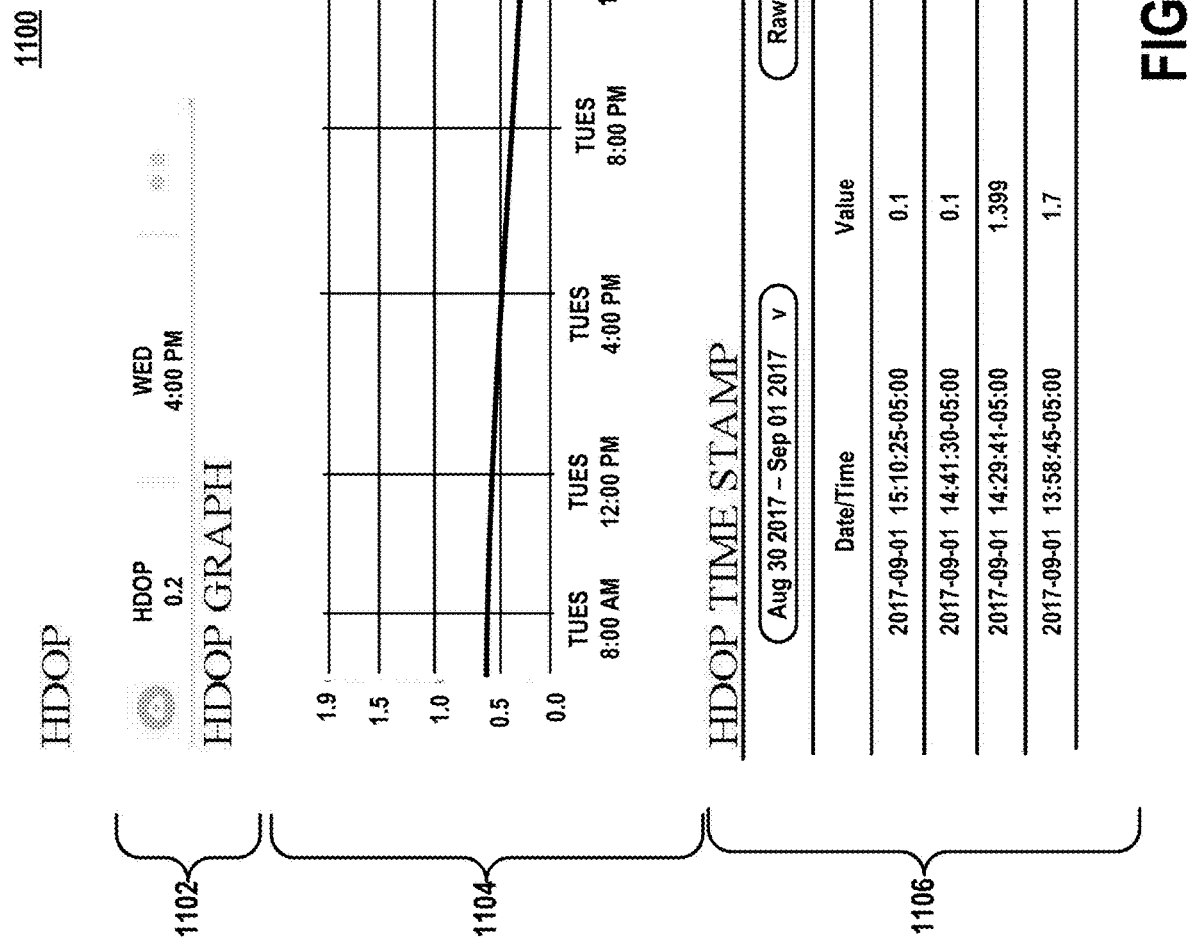
FIG. 11 illustrates an example user interface of a dashboard which presents a horizontal dilution of precision (HDOP) measure of the geometric quality of a GPS satellite configuration for determining a relative accuracy of a horizontal position, thereby providing an indication of the accuracy of the location tracking information of a given asset over a given period during transit, according to an embodiment of the invention.

FIG. 11 illustrates an example user interface 1100 of a dashboard which presents a HDOP measure of the geometric quality of a GPS satellite configuration for determining a relative accuracy of a horizontal position, thereby providing an indication of the accuracy of the location tracking information of a given asset over a given period during transit, according to an embodiment of the invention. The user interface 1100 includes a block 1102 that provides a current HDOP value that is computed by the GPS receiver of the smart label. A block 1104 provides a graphical illustration of the computed HDOP values over a period of time in transit. Each point in time of the graph (x-axis) represents a time at which a current HDOP value was computed at a time for a given current location, and the HDOP value (y-axis) at each point represents the computed HDOP measure as computed by the GPS receiver at that point. A block 1106 provides raw data associated with the HDOP values date stamp, time stamp, and computed HDOP value.

Figure 12:
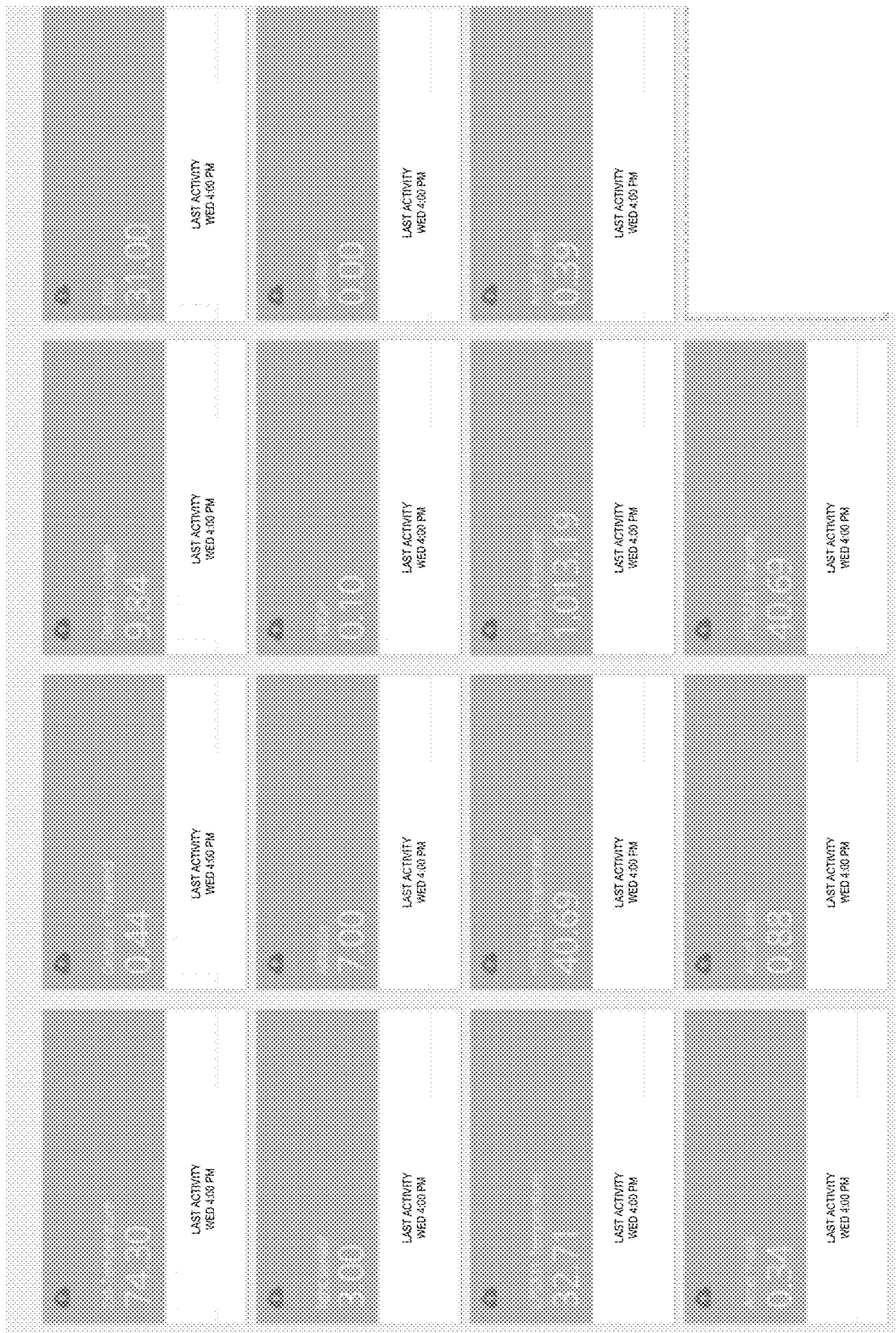
FIG. 12 illustrates an example user interface of a dashboard which presents a plurality of recently detected and computed measurement from various sensors that are configured for monitoring the location and environmental conditions of an asset in transit, according to an embodiment of the invention.

FIG. 12 illustrates an example user interface 1200 of a dashboard which presents a plurality of recently detected and computed measurements from various sensors that are configured for monitoring the location and environmental conditions of an asset in transit, according to an embodiment of the invention. The user interface 1200 is configured to provide an array of items that present last recorded sensor values or measurements that are recorded/computed by the smart label and uploaded to the service provider.

FIG. 13 illustrates various notification icons which can be utilized to provide notice to a customer regarding potential delays in delivery of an asset of the customer, according to embodiments of the invention. The notification icons provide indication of different weather conditions, such as lightening, snow storms, tornados, blizzards, extreme rain, hail, high winds, etc., which can be rendered and presented to a customer on the customer's computing device to provide notification of potential delay in the delivery of a given asset due to current weather conditions.

Although exemplary embodiments of the present invention have been described herein with reference to the accompanying figures, it is to be understood that the invention is not limited to those precise embodiments, and that various other changes and modifications may be made therein by one skilled in the art without departing from the scope of the appended claims.

What is claimed is:

1. A system for asset tracking and monitoring, comprising:
package label; and
a computing system of a service provider;
wherein the package label comprises:
a flexible substrate comprising a plurality of components disposed on the flexible substrate, wherein the components comprise:
a processor to control operations of the package label;
a memory device;
a wireless communications device; and
a global positioning system (GPS) device configured to determine a geolocation of the package label;
wherein the processor is configured to capture monitored information comprising location information by periodically collecting real-time location information from the GPS device at a first predetermined time interval, and storing the monitored information in the memory device;
wherein the processor is configured to periodically access the monitored information stored in the memory device and command the wireless communications device to transmit the monitored information to the computing system of the service provider at a second predetermined time interval; and
wherein the computing system of the service provider comprises at least one server node, wherein the at least one server node comprises at least one processor, and a system memory configured to store program code, wherein the program code is executable by the at least one processor to implement an asset tracking and monitoring system that is configured to:
receive the monitored information transmitted from the wireless communications device of the package label affixed to an asset being shipped by a registered user from an origin location to a destination location;
store the received monitored information in a database and associate the received monitored information with the registered user, wherein the received monitored information is associated with the registered user using a unique identifier of the package label which is included with the received monitored information, wherein the unique identifier of the package label is associated with the registered user during a package label provisioning process;
render and present stored monitored information on a computing device of the registered user;
maintain a database of historical transit and package delivery performance information for a shipping carrier utilized by the registered user for shipping assets of the registered user, wherein the historical transit and package delivery performance information is derived at least in part from the monitored information;
analyze the historical transit and package delivery performance information against time-in-transit information provided by the shipping carrier to determine an effectiveness of the shipping carrier in providing overnight shipping services for assets of the registered user; and
automatically provide a recommendation to the registered user for utilizing an overnight shipping service of the shipping carrier based on results of said analyzing.

2. The system of claim 1, wherein the package label further comprises a temperature sensor, and wherein the monitored information further comprises temperature information obtained from the temperature sensor.

3. The system of claim 1, wherein the package label further comprises a humidity sensor, and wherein the monitored information further comprises humidity information obtained from the humidity sensor.

4. The system of claim 1, wherein the package label further comprises an altimeter sensor, and wherein the monitored information further comprises barometric pressure information obtained from the altimeter sensor.

5. The system of claim 1, wherein the package label further comprises a light sensor, and wherein the monitored information further comprises light exposure information obtained from the light sensor.

6. The system of claim 1, wherein the package label further comprises an x-y-z accelerometer, and wherein the monitored information further comprises motion information obtained from the x-y-z accelerometer.

7. The system of claim 1, wherein the unique identifier of the package label comprises a mobile equipment identifier (MEID) of one of a cellular modem and satellite modem of the package label.

8. The system of claim 1, wherein the asset tracking and monitoring system is further configured to:
present a package label provisioning user interface to enable the registered user to provision the package label prior to use of the package label;
wherein package label provisioning user interface enables the registered user to provision the package label by inputting a unique identifier of the package label and specifying one or more parameters to control real-time tracking and monitoring operations of the package label,
wherein the one or more parameters specify one or more types of information to monitor and upload from the package label to the service provider; and
wherein the one or more parameters specify the first predetermined time interval and the second predetermined time interval.

9. The system of claim 8, wherein the asset tracking and monitoring system is further configured to:
download configuration data to the package label to configure operations of the package label based on the one or more parameters specified by the registered user.

10. The system of claim 1, wherein the first predetermined time interval and the second predetermined time interval are the same.

11. The system of claim 1, wherein the first predetermined time interval is less than the second predetermined time interval.

12. The system of claim 1, wherein the wireless communications device comprises at least one of a cellular modem and a satellite modem.

13. A package label, comprising:
a flexible substrate comprising a plurality of components disposed on the flexible substrate, wherein the components comprise:
a processor configured to control operations of the package label;
a memory device;

a global positioning system (GPS) device configured to determine a geolocation of the package label;

plurality of sensors configured to determine sensor information;

wherein the processor is configured to periodically collect real-time location data from the GPS device and sensor information from the plurality of sensors, at a first predetermined time interval, and store the collected information in the memory device; and a wireless communications device configured to transmit the collected real-time location data and sensor information to a remote service provider for access by a registered user of the package label, under control of the processor;

wherein the processor is configured to periodically access the real-time location data and sensor information in the memory device and command the wireless communications device to transmit the collected location data and sensor information to the remote service provider at a second predetermined time interval;

wherein the plurality of sensors comprises one or more of:

a temperature sensor to capture real-time temperature information which comprises at least one of an external ambient temperature surrounding the asset, and a temperature of the asset;

a humidity sensor to capture real-time humidity information;

an altimeter sensor to capture real-time barometric pressure information;

a light sensor to capture real-time light exposure information; and an x-y-z accelerometer to capture real-time motion information.

14. The package label of claim 13, wherein the wireless communications device comprises a cellular modem.

15. The package label of claim 13, wherein the first predetermined time interval and the second predetermined time interval are the same.

16. The package label of claim 13, wherein the first predetermined time interval is less than the second predetermined time interval.

17. The package label of claim 13, wherein the wireless communications device comprises a satellite modem.

* * * * *